(12) United States Patent
Antonopoulos

(10) Patent No.: US 11,296,353 B2
(45) Date of Patent: Apr. 5, 2022

(54) METHOD FOR PRODUCING A SOLID STATE ELECTROLYTE, SOLID STATE ELECTROLYTE AND LITHIUM ION BATTERY

(71) Applicant: Bayerische Motoren Werke Aktiengesellschaft, Munich (DE)

(72) Inventor: Byron Konstantinos Antonopoulos, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 92 days.

(21) Appl. No.: 16/245,499

(22) Filed: Jan. 11, 2019

(65) Prior Publication Data

US 2019/0148766 A1 May 16, 2019

Related U.S. Application Data

(63) Continuation of application No. PCT/EP2017/059702, filed on Apr. 25, 2017.

(30) Foreign Application Priority Data

Jul. 13, 2016 (DE) .................... 10 2016 212 736.5

(51) Int. Cl.
*H01M 10/0525* (2010.01)
*H01M 10/0562* (2010.01)
(Continued)

(52) U.S. Cl.
CPC ....... *H01M 10/0525* (2013.01); *H01M 4/131* (2013.01); *H01M 10/052* (2013.01);
(Continued)

(58) Field of Classification Search
CPC ......... H01M 10/0525; H01M 10/0562; H01M 10/0567; H01M 10/0569; H01M 4/131
See application file for complete search history.

(56) References Cited

U.S. PATENT DOCUMENTS

2004/0126653 A1 7/2004 Visco et al.
2008/0020283 A1 1/2008 Miyashiro et al.
(Continued)

FOREIGN PATENT DOCUMENTS

CN 101015074 A 8/2007
CN 100380712 C 4/2008
(Continued)

OTHER PUBLICATIONS

International Search Report (PCT/ISA/210) issued in PCT Application No. PCT/EP2017/059702 dated Jul. 6, 2017 with English translation (four (4) pages).
(Continued)

*Primary Examiner* — Osei K Amponsah
(74) *Attorney, Agent, or Firm* — Crowell & Moring LLP

(57) ABSTRACT

A method is provided for producing a solid state electrolyte for a lithium ion battery. The method includes the following steps: i) providing a layer of a solid state electrolyte; and ii) coating at least one first surface of the layer of the solid state electrolyte with a first coating, which has an electrochemical stability at potentials of −1 to 5 V measured against Li/Li⁺.

12 Claims, 1 Drawing Sheet

(51) Int. Cl.
  *H01M 10/0567* (2010.01)
  *H01M 10/0569* (2010.01)
  *H01M 4/131* (2010.01)
  *H01M 10/052* (2010.01)

(52) U.S. Cl.
  CPC ... *H01M 10/0562* (2013.01); *H01M 10/0567* (2013.01); *H01M 10/0569* (2013.01)

(56) References Cited

U.S. PATENT DOCUMENTS

| | | | |
|---|---|---|---|
| 2011/0281167 A1* | 11/2011 | Sabi | H01M 10/0562 429/221 |
| 2012/0183868 A1 | 7/2012 | Toussaint et al. | |
| 2014/0227606 A1 | 8/2014 | Suzuki et al. | |
| 2015/0064537 A1* | 3/2015 | Christensen | H01M 10/0562 429/126 |
| 2015/0099188 A1 | 4/2015 | Holme et al. | |
| 2015/0311562 A1* | 10/2015 | Le Van-Jodin | H01M 10/0562 429/126 |
| 2016/0254572 A1* | 9/2016 | Yu | H01M 10/0569 429/126 |

FOREIGN PATENT DOCUMENTS

| | | |
|---|---|---|
| CN | 101937982 A | 1/2011 |
| CN | 102598378 A | 7/2012 |
| CN | 103123961 A | 5/2013 |
| CN | 103814472 A | 5/2014 |
| CN | 105636921 A | 6/2016 |
| JP | 4-315775 A | 11/1992 |

OTHER PUBLICATIONS

German-language Written Opinion (PCT/ISA/237) issued in PCT Application No. PCT/EP2017/059702 dated Jul. 6, 2017 (five (5) pages).

German Search Report issued in counterpart German Application No. 102016212736.5 dated Mar. 14, 2017 with partial English translation (15 pages).

West W.C. et al., "Chemical Stability Enhancement of Lithium Conducting Solid Electrolyte Plates Using Sputtered LiPON Thin Films", Journal of Power Sources, pp. 134-138, 2004, vol. 126, Elsevier (five (5) pages).

Chinese-language Office Action issued in Chinese Application No. 201780043077.9 dated Apr. 23, 2021 with English language translation (23 pages).

* cited by examiner

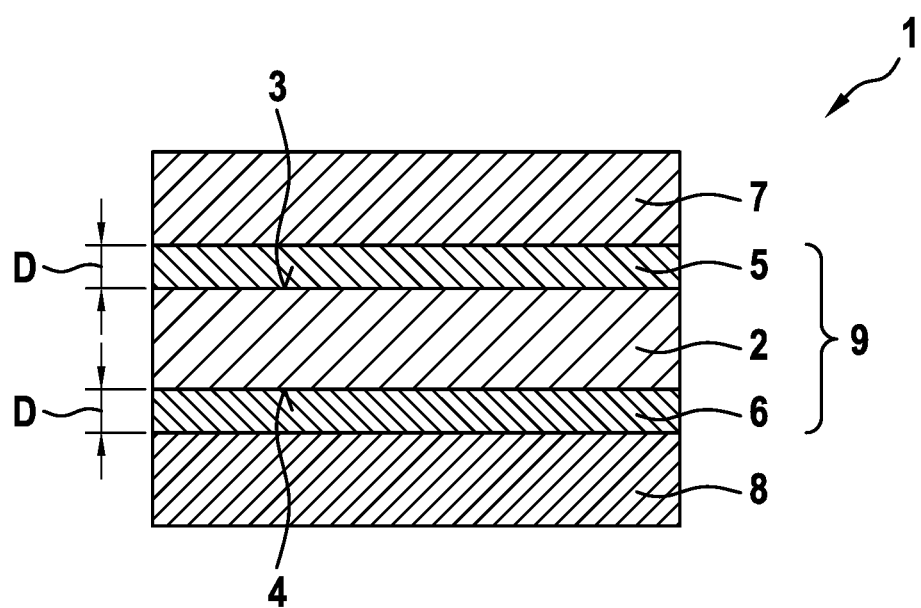

METHOD FOR PRODUCING A SOLID STATE ELECTROLYTE, SOLID STATE ELECTROLYTE AND LITHIUM ION BATTERY

CROSS REFERENCE TO RELATED APPLICATIONS

This application is a continuation of PCT International Application No. PCT/EP2017/059702, filed Apr. 25, 2017, which claims priority under 35 U.S.C. § 119 from German Patent Application No. 10 2016 212 736.5, filed Jul. 13, 2016, the entire disclosures of which are herein expressly incorporated by reference.

BACKGROUND AND SUMMARY OF THE INVENTION

The present invention relates to a method for producing a solid electrolyte and a solid electrolyte with improved ionic conductivity. In addition, the present invention also relates to a lithium ion battery that in particular is configured in the form of a secondary lithium ion battery and is characterized by a high capacity.

Solid electrolytes play a role in providing high volumetric and gravimetric energy and power densities in batteries and are also preferred to liquid electrolytes or gel electrolytes for safety reasons. Like liquid electrolytes, solid electrolytes are unstable at low chemical potentials, such as those occurring at the negative electrodes (anodes) of a battery, and also at high potentials, such as those occurring at the positive electrodes (cathodes) of a battery, and are decomposed by reduction or oxidation. At the interface between the electrolyte and electrode, layers (interface structures) of electrolyte decomposition products are formed, in some cases with consumption of electrode materials, which are characterized by reduced ionic conductivity and thus produce additional ohmic resistance in a battery cell. These cause the energy and power densities to be reduced. In addition, consumption of electrode materials reduces the capacity of the battery.

It is an object of the present invention to provide a method for producing a solid electrolyte by means of which the decomposition reactions during use of the solid electrolyte in a battery cell can be avoided and a reduction in ionic conductivity can be effectively prevented. Another object of the present invention is to provide a solid electrolyte that is characterized by a reduced tendency to form interface structures and thus having lasting high ionic conductivity and stability. It is also an object of the invention to provide a lithium ion battery or a secondary lithium ion battery having high capacity and stability.

This and other objects of the invention are achieved by means of a method for producing a solid electrolyte in which a layer of a solid electrolyte is first provided, after which at least one first surface of the layer of the solid electrolyte is coated with a first coating that has an electrochemical stability at potentials of −1 to 5 volts (V) measured against $Li/Li^+$.

The solid electrolyte to be used is not specifically limited. Suitable solid electrolytes are, e.g., phosphates, oxides, sulfides, garnets, perovskites, LISICON, LIPON, NASICON and thio-LISICON. Moreover, the form of the layer of the solid electrolyte is not limited and can be configured according to the requirements of conductivity and stability.

The layer of the solid electrolyte has a first surface. The first surface is a surface that ordinarily comes into contact with an electrode on installation in a battery cell. In other words, the first surface is a surface of the layer of the solid electrolyte facing an electrode.

At least the first surface is coated according to the invention. The first coating exhibits electrochemical stability at potentials of −1 up to 5 V measured against $Li/Li^+$. A first coating within the meaning of the invention can be composed of an individual compound, a mixture of compounds, or a coating composition. The first coating is inert with respect to the electrolyte material and undergoes no electrochemical reaction, and in particular there is no degradation, at potentials of −1 up to 5 V measured against $Li/Li^+$. This means that the first coating is not electrochemically reacted, both at low voltages/potentials such as those occurring for example at an anode of a battery cell and at high voltages/potentials such as those occurring e.g., at a cathode of a battery cell.

By means of coating of the solid electrolyte, the first surface of the layer of the solid electrolyte is effectively provided with a protective layer. This prevents or reduces direct electrical contact between the electrolyte and an electrode to be contacted. Because of the electrochemical stability of the first coating, on installation of the solid electrolyte in a battery cell, decomposition reactions of the electrolyte therefore do not occur. In addition, because there is no degradation of the electrolyte, no electrode material is consumed. Formation of conductivity-reducing interface structures either does not occur or is effectively hindered by the protective first coating. In this manner, the service life of the solid electrolyte can be improved, with accompanying improved ionic conductivity. This also makes it possible to increase the power density and the energy density of a battery comprising the solid electrolyte produced according to the invention.

The method of the present invention can be economically implemented in a simple manner without requiring complex technology.

According to an advantageous improvement of the method, the method includes a step of coating a second surface of the layer of the solid electrolyte with a second coating that has an electrochemical stability at potentials of −1 to 5 V measured against $Li/Li^+$. The second surface is also a surface that faces an electrode on installation of the layer of the solid electrolyte in a battery cell. For example, the first coating can be a coating that is formed on the first surface of the solid electrolyte and faces an anode in a battery cell. In this case, the second coating would be a coating that is formed on the second surface of the solid electrolyte and faces a cathode in a battery cell. Alternatively, the first coating can also be a coating that is formed on the first surface of the solid electrolyte and faces a cathode in a battery cell. In this case, the second coating would be a coating that is formed on the second surface of the solid electrolyte and faces an anode in a battery cell.

The second coating can be configured analogously to the first coating, but it can also have a different composition. In any case, the second coating also exhibits electrochemical stability at potentials of −1 to 5 V measured against $Li/Li^+$. By means of the two-sided coating, the solid electrolyte is electrochemically shielded on both surfaces that can come into contact with electrodes and is not subject to any decomposition reactions. Neither the anode material nor the cathode material is consumed with accompanying formation of interface structures. The solid electrolyte is characterized by particularly high ionic conductivity and a capacity to provide higher energy densities.

In a particularly advantageous manner, the first coating exhibits electrochemical stability at potentials of −1 to 1.5 V measured against Li/Li$^+$. The potential range indicated is a potential range that can lead to decomposition reactions of the electrolyte and anode material, in particular by formation of a SEI (solid electrolyte interphase). The first coating is therefore applied in particular to the side of the solid electrolyte that faces the anode on installation in a battery cell.

Alternatively or additionally, it is advantageously provided that the second coating has an electrochemical stability at potentials of 2 to 5 V measured against Li/Li$^+$. Potential ranges of 2 to 5 V can lead to decomposition reactions (oxidation) of the electrolyte and cathode material. The second coating is therefore applied in particular to the side of the solid electrolyte that faces the cathode on installation in a battery cell.

Particularly advantageously, the solid electrolyte is coated on its first surface with a first coating that exhibits stability at potentials of −1 to 1.5 V and on its second surface with a second coating that exhibits stability at potentials of 2 to 5 V. In this way, the solid electrolyte is protected from degradation when in use in a battery in a particularly favorable manner.

Further advantageously, the first coating is selected from: LiOH, Li$_2$CO$_3$, LiF, Li$_2$O, polyvinylene carbonate, lithium ethylene dicarbonate (LEDC), lithium disilicate (LDC), lithium manganese cobalt (LMC), CH$_3$OLi, CH$_3$CH$_2$OLi, LiOCH$_2$CH$_2$OLi, Li$_3$N and mixtures thereof. Alternatively or additionally, the second coating is selected from: LiOH, Li$_2$CO$_3$, LiF, Li$_2$O, Li—La—Ti—O, titanium oxides and phosphates, in particular AlPO$_4$, Nb$_2$O$_5$, and mixtures thereof. The individual components listed can in each case be used separately or in any desired combinations. If the first and second coatings are not directly applied in their final composition, but in the form of a coating composition, the coating composition can further include additives, such as, solvents, flow promoters, viscosity adapting agents, and the like. These additives are required only for application of the coating composition and can be removed following the coating process. However, it is not necessary to remove the additives if the additives behave in an inert manner with respect to the surrounding materials and the expected electrochemical reactions.

All of the above-mentioned compounds for the first coating meet the requirements for electrochemical stability at potentials of −1 to 1.5 V. Furthermore, all of the above-mentioned compounds for the second coating meet the requirements for electrochemical stability at potentials of 2 to 5 V respectively measured against Li/Li$^+$.

Particularly preferably, Li$_2$CO$_3$ is used as the first and/or second coating, as Li$_2$CO$_3$ can be quite favorably deposited or applied with the desired layer thickness, provides good ionic conductivity (in particular for lithium ions), and is also available at low cost.

Additionally, an advantageous improvement of the method is characterized in that coating is carried out by means of ALD (atomic layer deposition), PVD (physical vapor deposition), CVD (chemical vapor deposition), sputtering, or pulsed laser deposition. The coating methods listed here are known in the art. The above-mentioned methods are easy to use, easy to control, and produce homogenous coatings that also have low layer thicknesses. Particularly preferred is the ALD method, as this method allows very thin layer thicknesses to be achieved that have the least effect of impairing the ionic conductivity of the solid electrolyte.

In other embodiments of the invention, a solid electrolyte is provided for a lithium ion battery that in particular is configured in the form of a secondary lithium ion battery. The solid electrolyte according to the invention includes a layer of a solid electrolyte with a first surface that is provided with a first coating. As discussed above for the method according to the invention, the first surface is a surface that faces an electrode on installation in a battery cell. It thus forms an interface between the electrolyte and the electrode.

The solid electrolyte is not specifically limited, and for example can include phosphates, oxides, sulfides, garnets, perovskites, LISICON, LIPON, NASICON, and thio-LISICON. The form of the layer of the solid electrolyte is also not limited, and it can be configured according to the requirements for conductivity and stability.

The first surface of the solid electrolyte has a specific first coating. The first coating has electrochemical stability at potentials of −1 to 5 V measured against Li/Li$^+$ and functions as a protective layer in order to prevent degradation of the solid electrolyte at low potentials, such as those occurring for example at an anode, and at high potentials, such as those occurring for example at a cathode.

The first coating used within the meaning of the invention can be composed of an individual compound, a mixture of compounds, or a coating composition. As described above, the first coating is inert with respect to the electrolyte material, and it undergoes no electrochemical reaction at potentials of −1 to 5 V measured against Li/Li$^+$, and thus in particular there is no degradation. As a result, the first coating is not electrochemically reacted even at low potentials, such as those occurring for example at an anode of a battery cell, or at high potentials, such as those occurring at a cathode, but remains permanently stable.

The first coating according to the invention thus acts as a protective layer for the solid-state electrolyte. Its purpose is to prevent decomposition reactions of the electrolyte with formation of interface structures. This allows the solid electrolyte to retain its unreduced ionic conductivity. As a result, secondary reactions of the electrode material, which on installation in a battery cell comes into contact with the solid electrolyte according to the invention, can be prevented. The coating also prevents or reduces the direct electrical contact of the electrolyte with an electrode to be contacted. In this manner, no additional ohmic resistance values occur. The solid electrolyte according to the invention can play a role in providing high power density and capacity of a battery. In addition, the service life of the solid electrolyte can be increased with high stability.

The ionic conductivity of the solid electrolyte can be advantageously improved if a second surface of the layer of the solid electrolyte has a second coating that exhibits an electrochemical stability at potentials of −1 to 5 V measured against Li/Li$^+$. The second coating is advantageously configured in the same manner as the first coating. However, this is not absolutely necessary, provided that the second coating also meets the requirements for electrochemical stability at potentials of −1 to 5 V measured against Li/Li$^+$. The second coating also forms a further protective layer that protects the solid electrolyte as well as the electrode to be brought into contact with the solid electrolyte from degradation and the formation of interface structures.

According to a further embodiment, the first coating has an electrochemical stability at potentials of −1 to 1.5 V measured against Li/Li$^+$. This first coating thus protects the solid electrolyte in particular from degradation at low potentials such those occurring e.g. at anodes. In particular, the solid electrolyte is thus aligned with its first coating in the direction of the anode in a battery cell.

Alternatively or additionally, it is advantageous if the second coating has an electrochemical stability at potentials of 2 to 5 V measured against Li/Li+. The second coating thus protects the solid electrolyte from oxidative decomposition reactions that can occur in this elevated potential range, which can occur e.g., on the anode side of a battery cell. In particular, the solid electrolyte is thus aligned with its second coating in the direction of the cathode in a battery cell.

Further, with respect to favorable ionic conductivity, the first coating is selected from: LiOH, Li$_2$CO$_3$, LiF, Li$_2$O, polyvinylene carbonate, LEDC, LDC, LMC, CH$_3$OLi, CH$_3$CH$_2$OLi, LiOCH$_2$CH$_2$OLi, Li$_3$N and mixtures thereof. These coatings have good electrochemical stability at −1 to 1.5 V measured against Li/Li+ and are also characterized by good mechanical stability and electrical insulation capacity.

For the above reasons, it is also advantageous if the second coating is selected from: LiOH, Li$_2$CO$_3$, LiF, Li$_2$O, Li—La—Ti—O, titanium oxides and phosphates, in particular AlPO$_4$, Nb$_2$O$_5$ and mixtures thereof. All of the above-mentioned coatings meet the requirements for electrochemical stability at potentials of 2 to 5 V measured against Li/Li+ and also show good mechanical stability and electrical insulation capacity.

Among these aspects, and also with respect to favorable processability at acceptable costs, the use of Li$_2$CO$_3$ as a first and/or second coating is particularly advantageous.

Because of its favorable solid stability, the layer of a solid electrolyte used for the solid electrolyte according to the invention is preferably garnet-based, sulfide-based, or oxide-based.

For the above reason, the layer of a solid electrolyte of the solid electrolyte according to the invention advantageously includes LiLaZrO, a NASICON structure, or a perovskite.

In order to provide maximally high ionic conductivity in the solid electrolyte, the average layer thickness of the first and/or second coating is preferably 1 nm to 200 nm, and in particular 1 nm to 10 nm. The layer thickness is determined by means of XPS (X-ray photoelectron spectroscopy).

In other embodiments, a lithium ion battery and a secondary lithium ion battery are described, each of which includes the above-described solid electrolyte. By using the solid electrolyte according to the invention, high ionic conductivity is achieved in the battery, which has a positive effect on the capacity and the energy or power density of the battery. The battery is electrochemically stable and is not subject to degradation by electrochemical side reactions, such as, reductive decomposition of the solid electrolyte or the electrode material with the formation of interface structures.

The benefits, advantageous effects, and improvements described for the method according to the invention and the solid electrolyte according to the invention are also applicable to the lithium ion battery and secondary lithium ion battery according to the invention.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 shows a secondary lithium ion battery according to an embodiment of the invention in a sectional view.

DETAILED DESCRIPTION

FIG. 1 shows only the details that are essential to the invention. All other aspects of the invention are omitted for purposes of clarity.

In detail, FIG. 1 shows a secondary lithium ion battery 1 in a sectional view. The secondary lithium ion battery 1 is shown in a highly simplified and schematic manner and includes a layer of a solid electrolyte 2, a negative electrode 7, and a positive electrode 8.

The layer of the solid electrolyte 2 has a first surface 3 that faces the negative electrode 7 and a second surface 4 that faces the positive electrode 8.

The first surface 3 is coated with a first coating 5. Moreover, the second surface 4 is coated with a second coating 6.

Both the first coating 5 and the second coating 6 respectively have electrochemical stability at potentials of −1 to 5 V measured against Li/Li+. The coatings 5 and 6 are preferably applied by means of ALD, PVD, CVD, sputtering, or pulsed laser deposition to the first surface 3 or the second surface 4 of the layer of the solid electrolyte 2.

Advantageously, the first coating 5 is selected from LiOH, Li$_2$CO$_3$, LiF, Li$_2$O, polyvinylene carbonate, LEDC, LDC, LMC, CH$_3$OLi, CH$_3$CH$_2$OLi, LiOCH$_2$CH$_2$OLi, Li$_3$N and mixtures thereof and exhibits electrochemical stability at potentials of −1 to 1.5 V measured against Li/Li+. Also advantageously, the second coating 6 is selected from: LiOH, Li$_2$CO$_3$, LiF, Li$_2$O, Li—La—Ti—O, titanium oxides and phosphates, in particular AlPO$_4$, Nb$_2$O$_5$ and mixtures thereof, and exhibits electrochemical stability at potentials of 2 to 5 V measured against Li/Li+.

In particular, the average layer thickness D of the first and/or second coating 5, 6 is 1 nm to 200 nm and can be determined by means of XPS. Further preferred layer thicknesses, in particular of 1 nm to 10 nm, can advantageously be applied by ALD. The layer thickness D is determined in the stack direction of the layers forming the secondary lithium ion battery.

The use of the solid electrolyte 9 with a first coating 5 and a second coating 6 prevents the formation of interface structures due to electrochemical decomposition reactions of the layer of the solid electrolyte 2. Furthermore, degradation of the electrodes 7, 8 is also prevented. The coatings 5, 6 thus act as a protective layer in order to ensure that high ionic conductivity is obtained through the solid electrolyte 9. The secondary lithium ion battery 1 thus has a high capacity and a highly favorable energy or power density. The secondary lithium ion battery 1 is electrochemically stable and undergoes no degradation due to electrochemical side reactions. In addition, thermal stability is ensured.

The above description of the present invention is given solely for illustrative purposes and not to limit the invention. In the context of the invention, various changes and modifications can be made without departing from the scope of the invention and its equivalents.

LIST OF REFERENCE NUMBERS

1 Secondary lithium ion battery
2 Layer of a solid electrolyte
3 First surface of the layer of a solid electrolyte
4 Second surface of the layer of a solid electrolyte
5 First coating
6 Second coating
7 Negative electrode
8 Positive electrode Solid-state electrolyte The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a solid electrolyte for a lithium ion battery, the method comprising the steps of:
   providing a layer of a solid electrolyte; and
   coating at least one first surface of the layer of the solid electrolyte with a first coating that has an electrochemical stability at potentials of −1 to 1.5 V when measured against $Li/Li^+$,
   coating a second surface of the layer of the solid electrolyte with a second coating that has an electrochemical stability at potentials of 2 to 5 V when measured against $Li/Li^+$,
   wherein the first coating is selected from the group consisting of: LEDC, LDC, LMC, $CH_3OLi$, $CH_3CH_2OLi$, $LiOCH_2CH_2OLi$, and mixtures thereof, and
   wherein the second coating is selected from the group consisting of: LiOH, $Li_2CO_3$, $Li_2O$, Li—La—Ti—O, titanium oxides and phosphates, $AlPO_4$, $Nb_2O_5$ and mixtures thereof.

2. The method according to claim 1, wherein the first coating is carried out by atomic layer deposition, physical vapor deposition, chemical vapor deposition, sputtering, or pulsed laser deposition.

3. The method according to claim 1, wherein the second coating is carried out by atomic layer deposition, physical vapor deposition, chemical vapor deposition, sputtering, or pulsed laser deposition.

4. A solid electrolyte fora lithium ion battery comprising a layer of a solid electrolyte with a first surface and a second surface,
   wherein the first surface has a first coating that has an electrochemical stability at potentials of −1 to 1.5 V when measured against $Li/Li^+$, wherein the second surface has a second coating that has an electrochemical stability at potentials oft to 5 V when measured against $Li/Li^+$,
   wherein the first coating is selected from the group consisting of: LEDC, LDC, LMC, $CH_3OLi$, $CH_3CH_2OLi$, $LiOCH_2CH_2OLi$, and mixtures thereof, and
   wherein the second coating is selected from the group consisting of: LiOH, $Li_2CO_3$, $Li_2O$, Li—La—Ti—O, titanium oxides and phosphates, $AlPO_4$, $Nb_2O_5$ and mixtures thereof.

5. The solid electrolyte according to claim 4, wherein the layer of a solid electrolyte is garnet-based, sulfide-based, or oxide-based.

6. The solid electrolyte according to claim 4, wherein the layer of a solid electrolyte comprises LiLaZrO, a NASICON structure, or a perovskite.

7. The solid electrolyte according to claim 4, wherein an average layer thickness (D) of the first coating is 1 nm to 200 nm.

8. The solid electrolyte according to claim 4, wherein an average layer thickness (D) of the first coating is 1 nm to 10 nm.

9. The solid electrolyte according to claim 4, wherein an average layer thickness (D) of the second coating is 1 nm to 200 nm.

10. The solid electrolyte according to claim 4, wherein an average layer thickness (D) of the second coating is 1 nm to 10 nm.

11. A lithium ion battery comprising a solid electrolyte according to claim 4.

12. A secondary lithium ion battery comprising a solid electrolyte according to claim 4.

* * * * *